United States Patent
Hsu

(10) Patent No.: US 9,459,695 B2
(45) Date of Patent: Oct. 4, 2016

(54) GESTURE RECOGNITION SYSTEM AND METHOD

(71) Applicant: PixArt Imaging Inc., Hsin-Chu (TW)

(72) Inventor: En-Feng Hsu, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 328 days.

(21) Appl. No.: 13/969,924

(22) Filed: Aug. 19, 2013

(65) Prior Publication Data

US 2014/0055566 A1    Feb. 27, 2014

(30) Foreign Application Priority Data

Aug. 27, 2012  (TW) ............... 101130948 A

(51) Int. Cl.

| H04N 13/02 | (2006.01) |
| G06F 3/01 | (2006.01) |
| G06F 3/00 | (2006.01) |
| G02B 27/00 | (2006.01) |
| H04N 5/225 | (2006.01) |
| H04N 9/04 | (2006.01) |
| G06K 9/00 | (2006.01) |
| G06K 9/20 | (2006.01) |

(52) U.S. Cl.
CPC ............ *G06F 3/017* (2013.01); *G02B 27/0075* (2013.01); *G06F 3/005* (2013.01); *G06F 3/011* (2013.01); *G06K 9/00335* (2013.01); *G06K 9/209* (2013.01); *G06K 9/2018* (2013.01); *H04N 5/2254* (2013.01); *H04N 5/2259* (2013.01); *H04N 9/045* (2013.01)

(58) Field of Classification Search
CPC ........ G06F 3/017; G06F 3/005; G06F 3/011; G06K 9/2018; G06K 9/209; G06K 9/00335; G02B 27/0075; H04N 5/2254; H04N 9/045; H04N 5/2259
USPC ................. 348/43, 46, 222.1, 231.99, 240.2; 345/633
See application file for complete search history.

(56) References Cited

U.S. PATENT DOCUMENTS

| 2002/0158973 | A1* | 10/2002 | Gomi ................ H04N 5/23293 348/240.2 |
| 2010/0073518 | A1* | 3/2010 | Yeh ........................ H04N 5/217 348/231.99 |
| 2011/0090311 | A1* | 4/2011 | Fang ........................ H04N 7/15 348/43 |
| 2011/0157399 | A1* | 6/2011 | Ogasahara ............. H04N 9/045 348/222.1 |
| 2011/0254861 | A1* | 10/2011 | Emura .................. G06F 3/0488 345/633 |

FOREIGN PATENT DOCUMENTS

WO        2011101036 A1     8/2011

* cited by examiner

*Primary Examiner* — Allen Wong
(74) *Attorney, Agent, or Firm* — Hauptman Ham, LLP

(57) ABSTRACT

A gesture recognition system includes an EDOF lens, an image sensor, and a processing unit. The image sensor successively captures image frames through the EDOF lens. The processing unit is configured to perform gesture recognition according to at least one object image within a sharpness range in the image frames thereby eliminating the interference from background objects.

21 Claims, 6 Drawing Sheets

| object depth | blue light sharpness | green light sharpness | red light sharpness |
|---|---|---|---|
| 10cm | 0.5 | 0.4 | 0.3 |
| 15cm | 0.6 | 0.5 | 0.4 |
| 20cm | 0.7 | 0.6 | 0.5 |
| 25cm | 0.8 | 0.7 | 0.6 |
| 30cm | 0.7 | 0.8 | 0.7 |
| 35cm | 0.6 | 0.7 | 0.8 |
| 40cm | 0.5 | 0.6 | 0.7 |
| 45cm | 0.4 | 0.5 | 0.6 |
| 50cm | 0.3 | 0.4 | 0.5 |

FIG. 5A

| object depth | blue light sharpness | green light sharpness | red light sharpness |
|---|---|---|---|
| 10cm | 0.2 | 0.15 | 0.1 |
| 40cm | 0.3 | 0.2 | 0.15 |
| 70cm | 0.4 | 0.3 | 0.2 |
| 100cm | 0.5 | 0.4 | 0.3 |
| 120cm | 0.6 | 0.5 | 0.4 |
| 140cm | 0.7 | 0.6 | 0.5 |
| 160cm | 0.8 | 0.7 | 0.6 |
| 180cm | 0.7 | 0.8 | 0.7 |
| 200cm | 0.6 | 0.7 | 0.8 |

FIG. 5B

GESTURE RECOGNITION SYSTEM AND METHOD

CROSS REFERENCE TO RELATED APPLICATION

This application claims the priority benefit of Taiwan Patent Application Serial Number 101130948, filed on Aug. 27, 2012, the full disclosure of which is incorporated herein by reference.

BACKGROUND

1. Field of the Disclosure

This disclosure generally relates to a human machine interface device and, more particularly, to a gesture recognition system and a gesture recognition method employing the extend depth of field (EDOF) lens.

2. Description of the Related Art

In recent years, introducing the interactive mechanism into multimedia systems so as to improve the operational convenience has become a popular technique, wherein the gesture recognition is an important technique adapted to replace the traditional mouse, stick or remote controller.

A gesture recognition system generally includes an image sensor and a processing unit, wherein the image sensor is configured to capture images containing an operating object, e.g. a finger, and the processing unit is configured to post-process the images and to accordingly control an application.

For example as shown in FIG. 1, an image senor 91 is configured to capture a plurality of images containing an object O within its focus range FR, and a processing unit 92 is configured to identify a position variation of the object O according to the images. However, the processing unit 92 is not able to identify a depth of the object O according to the images, and when the focus range FR includes another object, e.g. a background object O', the processing unit 92 can not distinguish the objects O and O' such that the control error may occur.

Referring to FIG. 2, in order to identify the depth of the object O, it is able to use an infrared light source 93 to project a pattern, e.g. a chessboard pattern, onto the object O such that the processing unit 92 can identify the depth of the object O according to a size of the pattern in the images captured by the image sensor 91. However, when the pattern is interfered by ambient light sources, the control error may still occur.

Accordingly, the present disclosure further provides a gesture recognition system and a gesture recognition method that may recognize a three-dimensional coordinate of an object and interact with an image device according to a coordinate variation of the three-dimensional coordinate.

SUMMARY

The present disclosure provides a gesture recognition system and a gesture recognition method that may determine at least one object depth according to the previously constructed comparison information or relative diagram of depths versus sharpness associated with different light colors of an EDOF lens.

The present disclosure further provides a gesture recognition system and a gesture recognition method that may remove the object outside a predetermined operable range so as to eliminate the interference from environment objects.

The present disclosure further provides a gesture recognition system and a gesture recognition method that may reduce the consumption power of the processing unit in operation by employing sub-sampling technique.

The present disclosure provides a gesture recognition system including an EDOF lens, an image sensor and a processing unit. The image sensor is configured to capture an image frame through the EDOF lens. The processing unit is configured to calculate a current sharpness value of at least one object image in the image frame and obtain a current depth of the at least one object image according to the current sharpness value and comparison information.

In one aspect, the comparison information includes information of depths versus sharpness associated with different light colors of the EDOF lens that is saved in a memory unit. The comparison information may be saved in the memory unit in the form of a lookup table or the like without any limitation.

The present disclosure further provides a gesture recognition method including: constructing and saving comparison information of depths versus sharpness associated with different light colors of an EDOF lens; capturing an image frame with an image sensor through the EDOF lens; calculating a current sharpness value of at least one object image in the image frame with a processing unit; and obtaining a current depth of the at least one object image according to the current sharpness value and the comparison information.

In one aspect, a current sharpness value of the object image may be the highest sharpness value of the object image contained in the image frame.

The present disclosure further provides a gesture recognition system including an EDOF lens, an image sensor, a memory unit and a processing unit. The image sensor is configured to successively capture image frames through the EDOF lens. The memory unit is configured to previously store a sharpness range associated with different light colors of the EDOF lens. The processing unit is configured to perform gesturing recognition according to at least one object image within the sharpness range in the image frames.

In one aspect, an operable range may be previously set and saved so that the processing unit may remove the object image outside the operable range accordingly thereby eliminating the interference from environment objects, wherein the operable range may be a depth range or a sharpness range set before shipment or in a setup stage before the system is actually operated. The sharpness range may include sharpness ranges of different color sub-images and the depth range may include depth ranges of different color sub-images. For example, the different color sub-images may include a red sub-image, a green sub-image and a blue sub-image.

In one aspect, the operable range may be determined by a depth threshold or a sharpness threshold. The present disclosure may perform the gesture recognition only using at least one object image having a depth smaller than the depth threshold or having a sharpness value larger than the sharpness threshold and remove other environment object images.

In one aspect, the processing unit is further configured to perform a sub-sampling process before obtaining the current sharpness value so as to reduce the consumption power of the processing unit in operation, wherein a sub-sampled pixel area of the sub-sampling process is at least a 6×6 pixel area or includes at least three different color pixels in every axis.

The gesture recognition method of the present disclosure further includes the steps of: separating the image frame to three color sub-images; calculating, using the processing unit, a current color sharpness value of at least one object image in at least one of the color sub-images of the image frame; and obtaining the current depth according to the current color sharpness value and the comparison information.

In the gesture recognition system and gesture recognition method of the present disclosure, the processing unit may calculate a three-dimensional coordinate of the object image according to an image frame captured by the image sensor or at least one color sub-image of the image frame, e.g. using a gravity center coordinate or a center coordinate of the object image in the image frame or in the at least one color sub-image of the image frame as the three-dimensional coordinate, which may include two transverse coordinates and a depth coordinate. The processing unit may further interact with a display device according to a coordinate variation of the three-dimensional coordinate between a plurality of image frames or color sub-images, e.g. controlling a cursor motion or an application.

BRIEF DESCRIPTION OF THE DRAWINGS

Other objects, advantages, and novel features of the present disclosure will become more apparent from the following detailed description when taken in conjunction with the accompanying drawings.

FIGS. 5A and 5B show comparison information of sharpness versus object depths associated with every light color in the gesture recognition system according to the embodiment of the present disclosure.

DETAILED DESCRIPTION OF THE EMBODIMENT

It should be noted that, wherever possible, the same reference numbers will be used throughout the drawings to refer to the same or like parts.

Figure 1:
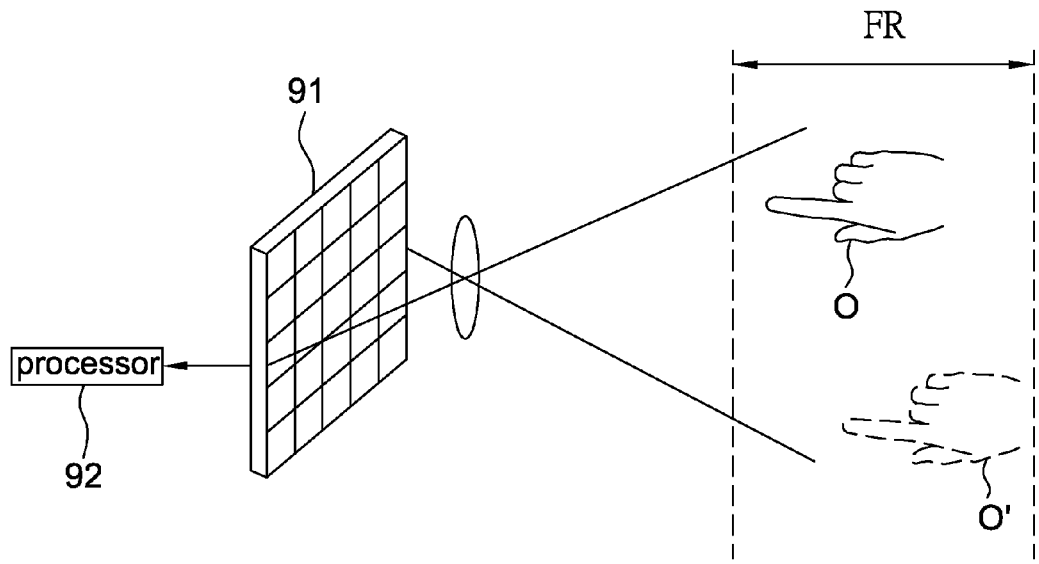
FIG. 1 shows a schematic diagram of the conventional gesture recognition system.
Figure 2:
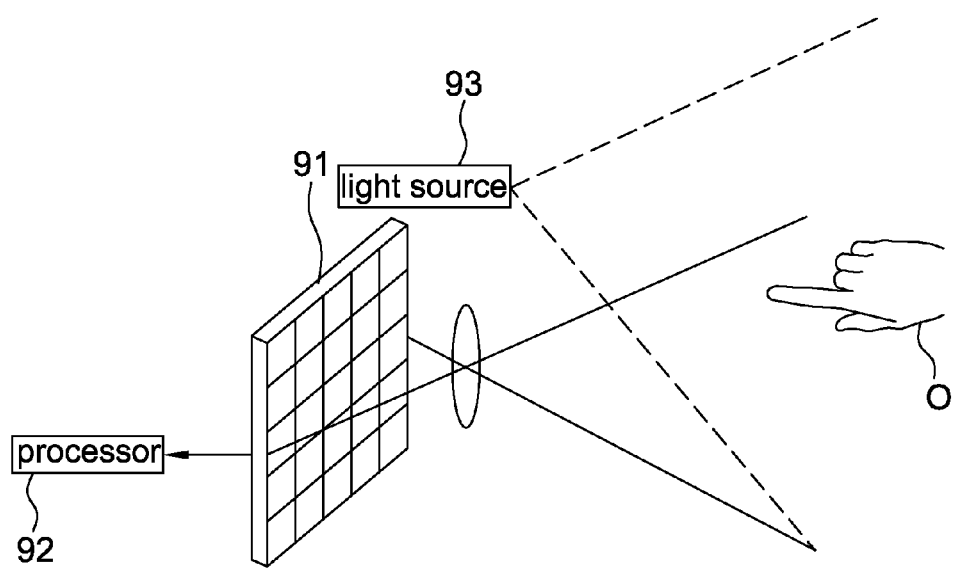
FIG. 2 shows a schematic diagram of another conventional gesture recognition system.
Figure 3A:
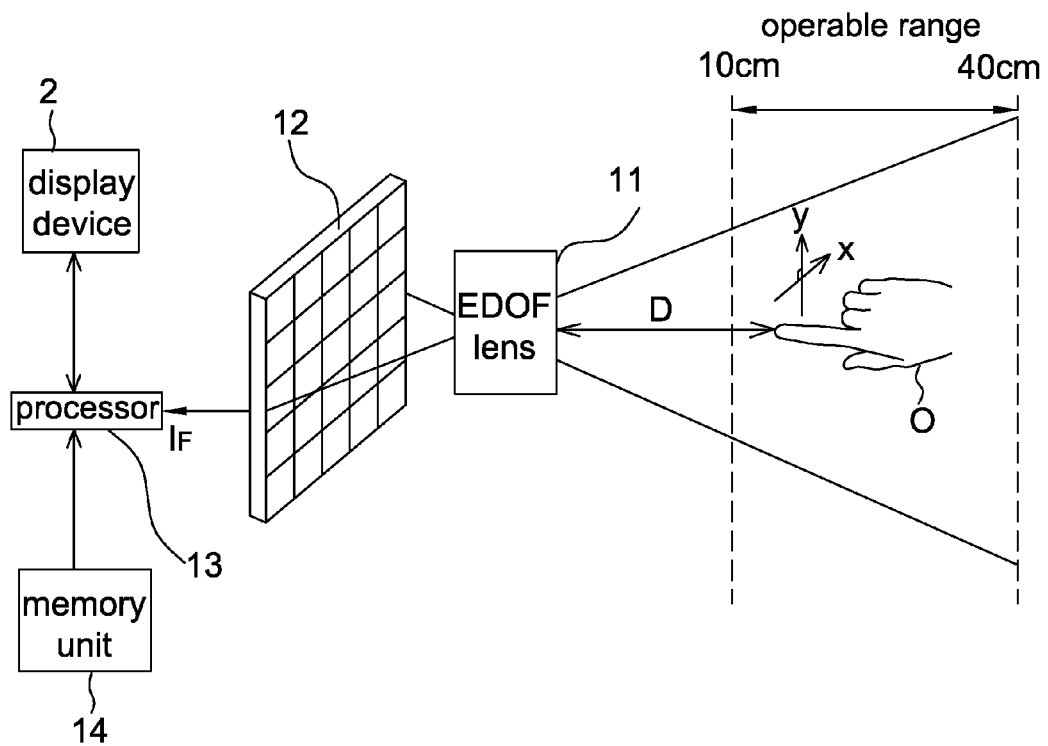
FIG. 3A shows a schematic diagram of the gesture recognition system according to an embodiment of the present disclosure.

Referring to FIG. 3A, it shows a schematic diagram of the gesture recognition system according to an embodiment of the present disclosure. The gesture recognition system includes an extend depth of field lens (EDOF lens) 11, an image sensor 12, a processing unit 13 and a memory unit 14, and the gesture recognition system may couple to and interact with a display device 2. The image sensor 12 may be a CCD image sensor, a CMOS sensor or other sensors for sensing optical energy, and configured to successively capture images of an object O through the EDOF lens 11 and to output image frames $I_F$, wherein a sensing array is shown herein to represent the image sensor 12.

Figure 4A:
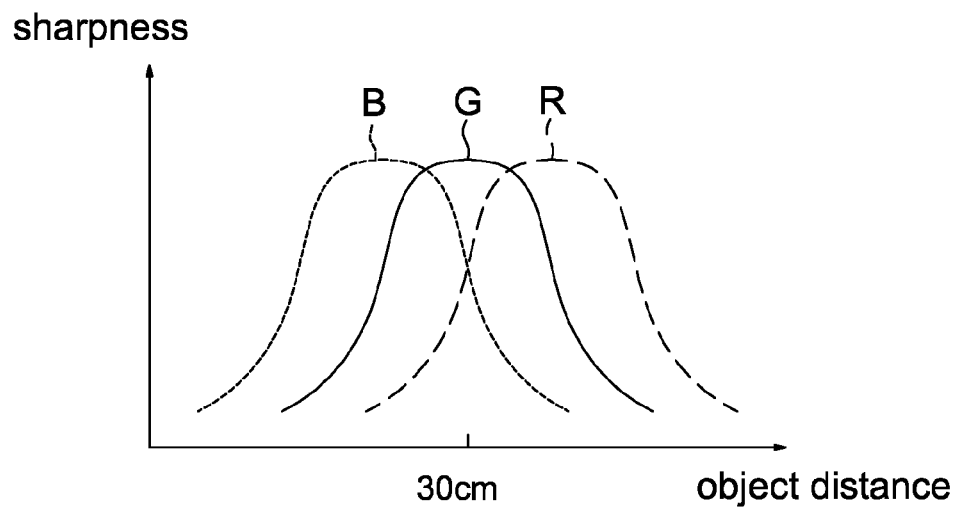
FIGS. 4A and 4B show relative diagrams of sharpness versus object distances associated with every light color in the gesture recognition system according to the embodiment of the present disclosure.
Figure 4B:
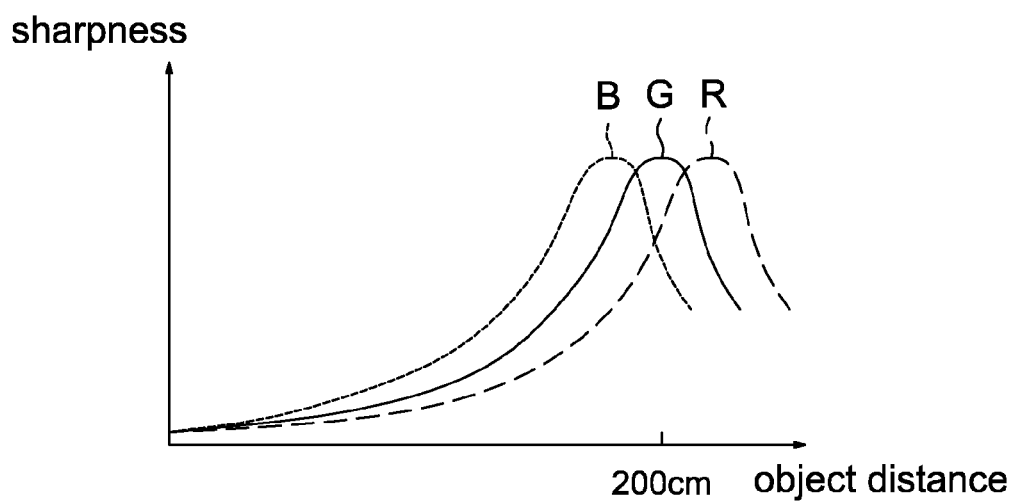

The memory unit 14 may previously save comparison information of depths versus sharpness associated with every light color of the EDOF lens 11 and an operable range associated with every light color, wherein the operable range may be a sharpness range or a depth range. For example referring to FIGS. 4A and 5A, FIG. 4A shows a relative diagram of depths (i.e. object distances) versus sharpness associated with different light colors when the optimum object distance of green light of the EDOF lens 11 is 30 cm, and FIG. 5A shows comparison information of depths versus sharpness associated with different light colors when the optimum object distance of green light of the EDOF lens 11 is 30 cm. For example referring to FIGS. 4B and 5B, FIG. 4B shows a relative diagram of depths versus sharpness associated with different light colors when the optimum object distance of green light of the EDOF lens 11 is 200 cm (or at infinity), and FIG. 5B shows comparison information of depths versus sharpness associated with different light colors when the optimum object distance of green light of the EDOF lens 11 is 200 cm. As the comparison information includes information of different light colors (e.g. including red light, green light and blue light), the sharpness range may also include sharpness ranges of different color sub-images, e.g. including a red light sharpness range, a green light sharpness range and a blue light sharpness range. The depth range may also include depth ranges of different color sub-images, e.g. including a red light depth range, a green light depth range and a blue light depth range. It is appreciated that values shown in FIGS. 4A, 4B, 5A and 5B are only exemplary but not to limit the present disclosure. The gesture recognition system and gesture recognition method according to the embodiment of the present disclosure use at least one object image only within the sharpness range to perform the gesture recognition.

In one embodiment, the operable range may be previously set and stored in the memory unit 14 before shipment of the gesture recognition system. In another embodiment, the operable range may be set and stored in the memory unit 14 in a setup stage before the gesture recognition system is actually operated, e.g. the setup stage in the starting procedure or the setup stage that a user selects to enter by means of a selection switch or a button. It should be mentioned that the operable range mentioned herein is not limited to between two values and may be determined by a predetermined threshold, e.g. a depth threshold or a sharpness threshold; for example, the present disclosure may perform the gesture recognition using at least one object image having a depth smaller than the depth threshold or having a sharpness value larger than the sharpness threshold.

In actual operation of the gesture recognition system of the present disclosure, the processing unit 13 is configured to perform the gesture recognition according to at least one object image within the sharpness range in the image frames $I_F$ and to interact with the display device 2 according to a gesture that has been recognized, e.g. controlling the cursor motion, updating screens or applications, but not limited thereto.

Figure 3B:
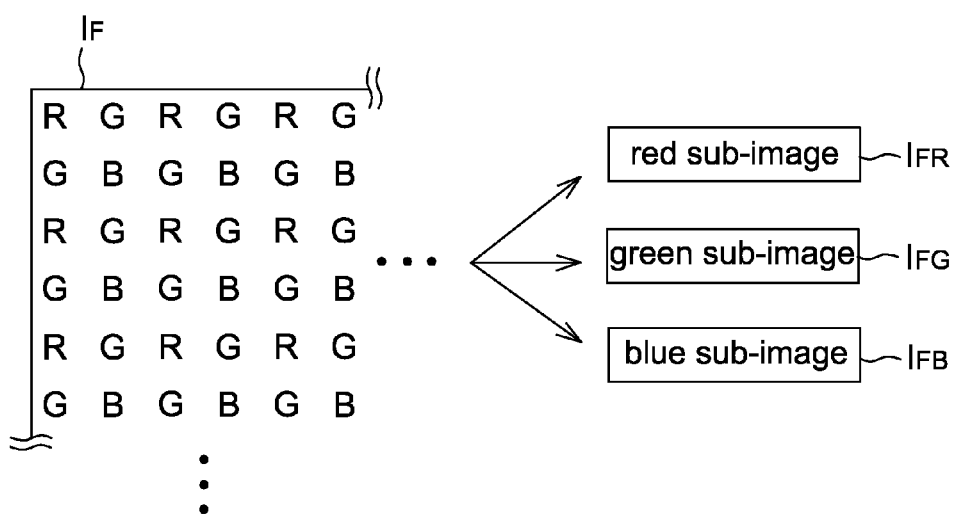
FIG. 3B shows a schematic diagram of separating different color sub-images in the gesture recognition system according to the embodiment of the present disclosure.

In one embodiment, the processing unit 13 calculates a current sharpness value of at least one object image in the image frames $I_F$ and obtains a current depth D according to the current sharpness value and comparison information, wherein the current sharpness value may be the highest sharpness value of the object image contained in the image frame. Referring to FIG. 3B, it shows an image frame $I_F$ in the Bayer arrangement. The processing unit 13 separates the image frame $I_F$ to different color sub-images at first, e.g. including a red sub-image $I_{FR}$, a green sub-image $I_{FG}$ and a blue sub-image $I_{FB}$. The processing unit 13 may obtain the current depth D of the object image according to a current color sharpness value of the object image in at least one of the color sub-images of the image frame $I_F$ and the comparison information, e.g. obtaining the current depth D by comparing a current green sharpness value of the green sub-image $I_{FG}$ with the comparison information; obtaining the current depth D by comparing a current green sharpness value of the green sub-image $I_{FG}$ and a current blue sharpness value of the blue sub-image $I_{FB}$ with the comparison information; or obtaining the current depth D by comparing a current green sharpness value of the green sub-image $I_{FG}$ and a current red sharpness value of the red sub-image $I_{FR}$ with the comparison information. The merit of selecting two color sub-images is that the problem of unable to correctly recognize the depth can be resolved. For example, if the comparison information of FIG. 5A is used and when the current green sharpness value is 0.7, two object depths are obtained. Therefore, it is preferably to compare another current color sharpness value so as to confirm the correct object depth; for example, when the current blue sharpness value is 0.8, it means that the object depth is 25 cm; whereas when the current blue sharpness value is 0.6, it means that the object depth is 35 cm. Of course, it is able to use all color sub-images for comparison so as to increase the accuracy. In other words, in this embodiment it is able to use the current color sharpness value of one color sub-image, two color sub-images or three color sub-images to compare with the comparison information so as to obtain the current depth D.

In addition, in order to remove the image of background objects, in this embodiment the processing unit 13 may further configured to remove the object image outside an operable range. Referring to FIG. 3A again, for example an operable range may be previously set as 10-40 cm (or its corresponding sharpness range) before shipment and saved in the memory unit 14; or the operable range may be set in a setup stage before the gesture recognition system of the present disclosure is actually operated. For example, a switching mode may be provided (e.g. in the starting procedure or by enabling a selection switch) to select the setup stage for setting the operable range to be saved in the memory unit 14. If the operable range is a sharpness range, when the current sharpness value (e.g. including at least one current color sharpness value) of an object image is calculated, the processing unit 13 may determine whether to keep the object image for post-processing directly according to the sharpness range without comparing with the comparison information. If the operable range is a depth range, the processing unit 13 may convert the current sharpness value of the object image to a current depth D according to the comparison information and then determine whether to keep the object image for post-processing according to the depth range.

Figure 6:
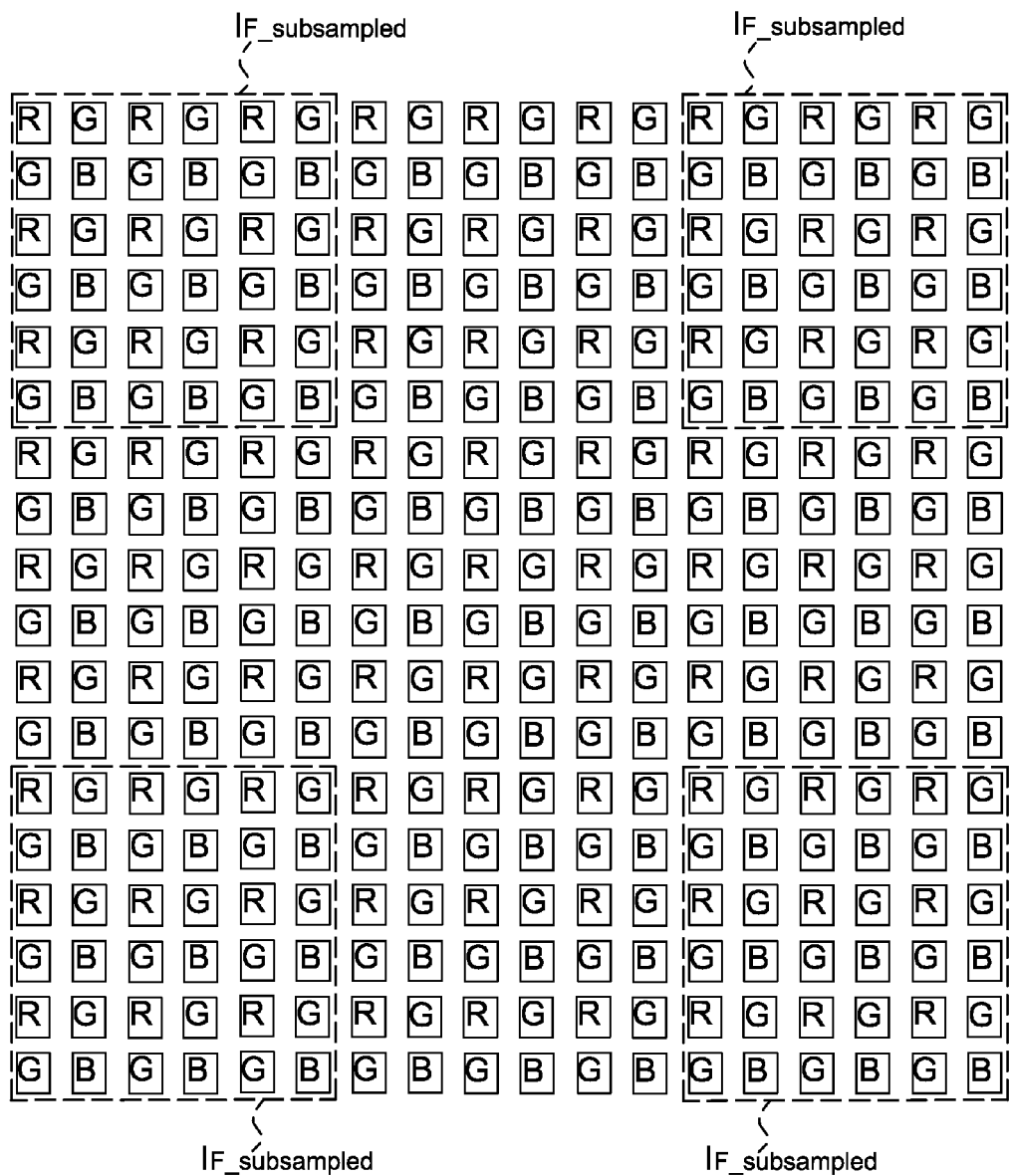
FIG. 6 shows a schematic diagram of the sub-sampling process of the gesture recognition system according to the embodiment of the present disclosure.

In addition, in order to reduce the power consumption of the processing unit 13 in operation, the processing unit 13 may perform a sub-sampling process on the image frame $I_F$ before obtaining the current sharpness value (or before performing the gesture recognition). In this embodiment, as the object depth has to be recognized according to different current sharpness values, in order not to loss image information of blurred areas in the sub-sampling process, each axis of the sub-sampled pixel area in the sub-sampling process preferably includes at least 3 every color pixels. For example referring to FIG. 6, the image sensor 12 may capture and output image frames $I_F$ having a size of 18×18, and the processing unit 13 only retrieves a part of pixel areas in the post-processing process, e.g. the sub-sampled pixel areas $I_{F\_subsampled}$ surrounded by dotted lines in FIG. 6. Pixels that are not surrounded by the dotted lines are abandoned. This is the sub-sampling process referred by the present disclosure. It is appreciated that, according to the size of the image frame $I_F$, a size of the sub-sampled pixel area $I_{F\_subsampled}$ does not have any limitation as long as it is larger than 6×6 pixel area. In addition, the sub-sampled pixel area $I_{F\_subsampled}$ in the sub-sampling process may be dynamically adjusted according to the image quality of the captured images, and this may be realized by changing the timing control of the image sensor. In this embodiment, the sub-sampling process may be performed by the processing unit 13 or by an additional sampling unit coupled in front of the processing unit 13.

After the current depth D of the object image is calculated or the object image within the operable range is retrieved, the processing unit 13 is able to calculate a three-dimensional coordinate of the object image according to the image frame $I_F$ or according to at least one color sub-image (e.g. $I_{FR}$, $I_{FG}$, $I_{FB}$) of the image frame $I_F$; e.g. calculating a plane coordinate (x,y) (e.g. a gravity center coordinate) according to a transverse position of the object image with respect to the image sensor 12 and obtaining a three-dimensional coordinate (x,y,D) of the object image further cooperating with the current depth D of the object image with respect to the EDOF lens 11. The processing unit 13 may interact with the display device 2 according to a coordinate variation ($\Delta$x,$\Delta$y,$\Delta$D) of the three-dimensional coordinate (x,y,D), e.g. controlling the cursor motion of a cursor on the display device 2, updating screens and/or applications (e.g. icon selection), but not limited thereto, wherein a gesture may be a simple two-dimensional transverse trace (i.e. horizontal movement) or a longitudinal trace (i.e. the movement of depth with respect to the image sensor 12 or the EDOF lens 11), or a three-dimensional trace, and various combinations are possible according to the user definition. Particularly, as the present embodiment may detect three-dimensional movement information of an object, the gesture motion may be defined by three-dimensional information so that more complicated and various gesture commands can be implemented.

Figure 7:
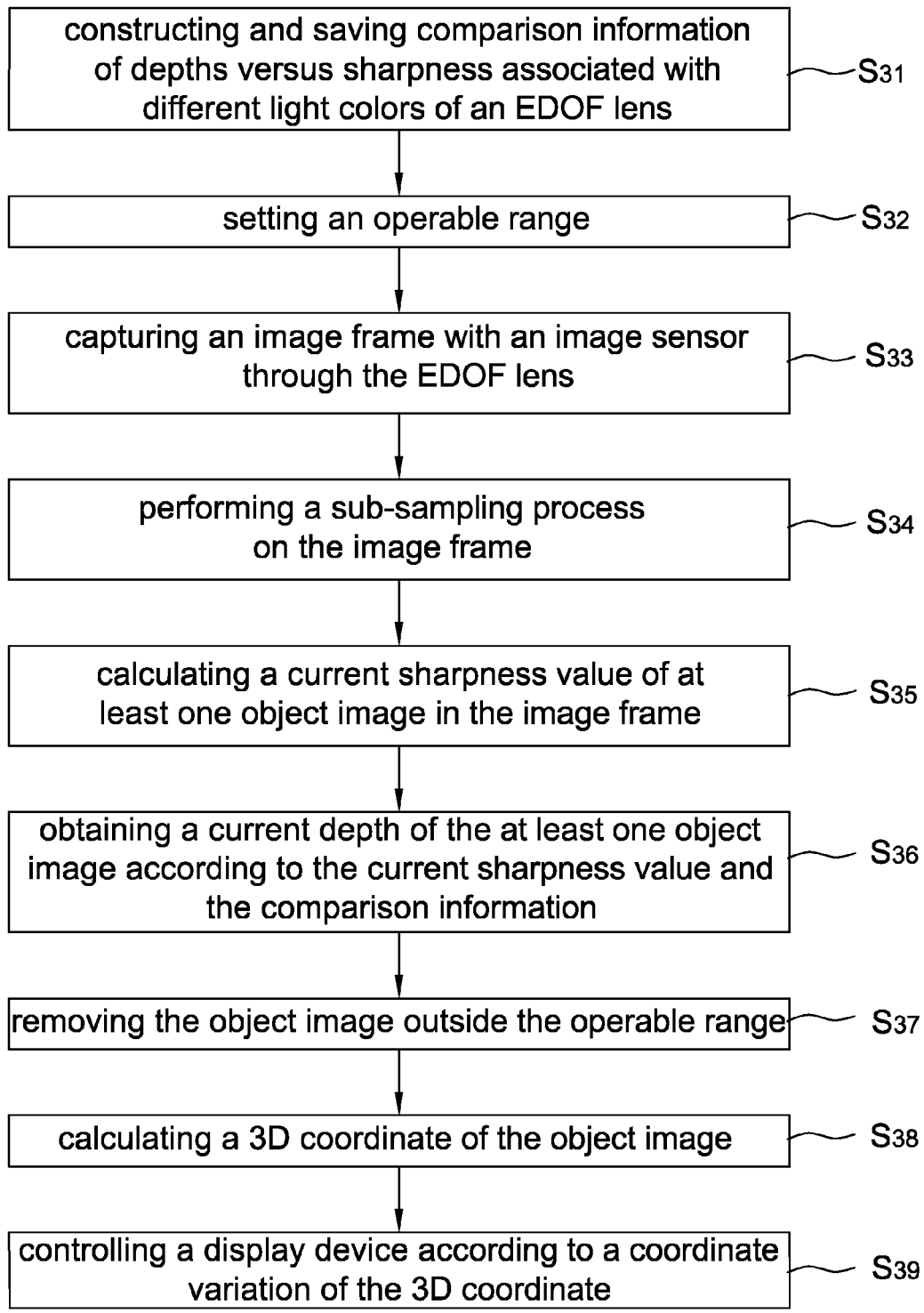
FIG. 7 shows a flow chart of the gesture recognition method according to the embodiment of the present disclosure.

Referring to FIG. 7, it shows a flow chart of the gesture recognition method according to an embodiment of the present disclosure, which includes the steps of: constructing and saving comparison information of depths versus sharpness associated with different light colors of an EDOF lens (Step $S_{31}$); setting an operable range (Step $S_{32}$); capturing an image frame with an image sensor through the EDOF lens (Step $S_{33}$); performing a sub-sampling process on the image frame (Step $S_{34}$); calculating a current sharpness value of at least one object image in the image frame (Step $S_{35}$); obtaining a current depth of the at least one object image according to the current sharpness value and the comparison information (Step $S_{36}$); removing the object image outside the operable range (Step $S_{37}$); calculating a three-dimensional coordinate of the object image (Step $S_{38}$); and controlling a display device according to a coordinate variation of the three-dimensional coordinate (Step $S_{39}$).

Referring to FIGS. 3 to 7, details of the gesture recognition method of this embodiment are described hereinafter.

Step $S_{31}$: Preferably, before shipment of the gesture recognition system, a relative diagram or comparison information of depths verses sharpness associated with different light colors of the EDOF lens 11 is previously constructed, e.g. the relative diagrams of object distances (i.e. depths)

versus blue light sharpness, green light sharpness and red light sharpness as shown in FIGS. 4A and 4B or the comparison information of object depths versus blue light sharpness, green light sharpness and red light sharpness as shown in FIGS. 5A and 5B. The relative diagram and the comparison information are stored in the memory unit 14 served as the lookup reference in actual operation.

Step $S_{32}$: Next, an operable range is set, and the operable range may be determined according to different applications of the gesture recognition system. In one embodiment, the operable range may be set before shipment of the gesture recognition system. In another embodiment, the operable range may be set by a user in a setup stage before the gesture recognition system is actually operated; i.e. the operable range may be set according to the requirement of user. As mentioned above, the operable range may be a sharpness range (including sharpness ranges of different color sub-images) or a depth range (including depth ranges of different color sub-images). In other embodiments, if the gesture recognition system is operated in an environment without the interference from the environment object, the Step $S_{32}$ may not be implemented.

Step $S_{33}$: In actual operation, the image sensor 12 captures an image frame $I_F$ through the EDOF lens 11 and the image frame $I_F$ is outputted to the processing unit 13. A size of the image frame $I_F$ may be determined according to different sizes of the sensing array of the image sensor 12.

Step $S_{34}$: After receiving the image frame $I_F$ and before calculating a current sharpness value of the object image, the processing unit 13 may selectively perform a sub-sampling process on the image frame $I_F$ so as to reduce the power consumption. As mentioned above, the size of a sub-sampled pixel area $I_{F\_subsampled}$ of the sub-sampling process is at least 6×6 such that at least 3 different color pixels are included in each axis. For example in the sub-sampled pixel area $I_{F\_subsampled}$ of FIG. 6, a transverse direction includes three red color pixels and three green color pixels, and a longitudinal direction includes three red color pixels and three green color pixels or including three green color pixels and three blue color pixels, wherein the color pixels included in each axis may be different according the arrangement of every color pixel and are not limited to those shown in FIG. 6. In addition, a size of the sub-sampled pixel area may be determined according to the size and/or the image quality of the image frame $I_F$. In other embodiments, the Step $S_{34}$ may not be implemented.

Step $S_{35}$: The processing unit 13 calculates a current sharpness value of at least one object image in the image frame $I_F$ according to the image frame $I_F$ or the sub-sampled image frame. In this embodiment, after the image sensor 12 captures an image frame $I_F$ through the EDOF lens 11, the processing unit 13 may separate the image frame $I_F$ or sub-sampled image frame to three color sub-images, e.g. the red sub-image $I_{FR}$, green sub-image $I_{FG}$ and blue sub-image $I_{FB}$ shown in FIG. 3B. The processing unit 13 then calculates a current color sharpness value, e.g. a current red sharpness value, a current green sharpness value or a current blue sharpness value, of at least one object image in the at least one color sub-image of the image frame $I_F$. In this embodiment, the method of calculating the sharpness value of an object image in the image frame is well known, e.g. calculating the modulation transfer function (MTF) value of the image frame, and thus details thereof are not described herein. For example, the current color sharpness value of the object image may be the highest current color sharpness value of the object image contained in the image frame.

Step $S_{36}$: The processing unit 13 compares the current sharpness value with the comparison information so as to obtain a current depth D of the at least one object image, e.g. a depth of the object O, corresponding to the current sharpness value. More specifically, the processing unit 13 obtains the current depth D of the object image according to the current color sharpness value and the comparison information, e.g. obtaining the current depth D according to at least one of the current red sharpness value, current green sharpness value and current blue sharpness value obtained the Step $S_{35}$ as well as the comparison information. In addition, when the current sharpness value is not included in the comparison information, the corresponding current depth D may be obtained by using the interpolation technique.

Step $S_{37}$: In order to eliminate the interference on the gesture recognition system from environment objects, the processing unit 13 may identify whether the current depth D is within the operable range or not after obtaining the current depth D of every object image and remove the object image outside the operable range. It is appreciated that when the Step $S_{32}$ is not implemented, the Step $S_{37}$ is neither implemented. In addition, the Step $S_{37}$ may also be performed simultaneously with calculating the current sharpness value (i.e. the Step $S_{35}$). When the processing unit 13 sequentially (e.g. sequentially from the first pixel at upper left corner to the last pixel at the lower right corner) receives every pixel value of the image frame $I_F$, the processing unit 13 may immediately identify whether the sharpness value of the pixel is within the operable range (i.e. the sharpness range). If the pixel sharpness is not within the operable range, it is directly removed without being processed, and the pixel information within the operable range is kept. In other words, the identification of the sharpness value may be performed according to a complete image frame already saved or sequentially performed according to every pixel, and only the pixel information within the operation range is saved. In this embodiment, the processing unit 13 takes the pixel area in the image frame within the operable range as the object image to be recognized and takes the pixel area in the image frame outside the operable range as the background object.

Step $S_{38}$: Next, the processing unit 13 may calculate a three-dimensional coordinate of each object image within the operable rage according to the image frame $I_F$ or according to at least one of the color sub-images ($I_{FR}$, $I_{FG}$, $I_{FB}$) of the image frame, e.g. including two transverse coordinates and a depth coordinate (i.e. the current depth D obtained in the Step $S_{36}$), wherein the method of calculating the transverse coordinates by the processing unit 13 is well known and thus details thereof are not described herein. The present embodiment is to correctly calculate the depth of the object O.

Step $S_{39}$: Finally, the processing unit 13 may control a display device 2 according to a coordinate variation of the three-dimensional coordinate between a plurality of the image frames $I_F$ or a plurality of the color sub-images ($I_{FR}$, $I_{FG}$, $I_{FB}$), e.g. controlling a cursor motion and/or an application, wherein the display device 2 may be a television, a projection screen, a computer screen, a game host screen or other display devices configured to display/project images.

After the three-dimensional coordinate is calculated, the gesture recognition method of this embodiment returns to the Step $S_{33}$ to capture a new image frame $I_F$ and then identifies following positions and the position variation of the object O. If only the depth of the object O is to be identified, after the current depth D is calculated, the gesture recognition method of this embodiment returns to the Step $S_{33}$ to capture a new image frame $I_F$ and then identifies following depths and the depth variation of the object O.

As mentioned above, the conventional gesture recognition method has the problem of unable to recognize the object depth or has the requirement of projecting an additional optical pattern. Therefore, the present disclosure further provides a gesture recognition system (FIG. 3A) and a gesture recognition method (FIG. 7) that may achieve the object of recognizing the object depth by employing an EDOF lens in conjunction with a previously constructed relative diagram (FIGS. 4A and 4B) or comparison information (FIGS. 5A and 5B) of depths versus sharpness associated with every light color of the EDOF lens. In addition, the gesture recognition system of the present disclosure may previously store a sharpness range associated every light color of the EDOF lens in a memory unit so as to perform the gesture recognition according to at least one object image within the sharpness range in the image frames and remove the environment objects outside the sharpness range thereby improving the accuracy of gesture recognition.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A gesture recognition system, comprising:
an extend depth of field (EDOF) lens;
an image sensor configured to capture an image frame through the EDOF lens wherein
the image frame comprises different color pixels arranged in a matrix, and
one color pixel among every two adjacent pixels in the image frame is associated with a first color and the other color pixel among the every two adjacent pixels in the image frame is associated with a second color different from the first color; and
a processing unit configured to
calculate a current sharpness value of at least one object image in the image frame, and
obtain a current depth of the object image according to the current sharpness value and comparison information,
wherein the current sharpness value is obtained by calculating a highest value of modulation transfer function values of the image frame captured through the EDOF lens.

2. The gesture recognition system as claimed in claim 1, wherein the comparison information comprises information of depths versus sharpness of the EDOF lens in association with different light colors.

3. The gesture recognition system as claimed in claim 2, wherein the processing unit is configured to obtain the current depth of the object image according to
a current color sharpness value of the object image in at least one color sub-image of the image frame, and
the comparison information.

4. The gesture recognition system as claimed in claim 1, wherein the processing unit is further configured to remove the object image outside an operable range.

5. The gesture recognition system as claimed in claim 4, wherein the operable range is a sharpness range or a depth range.

6. The gesture recognition system as claimed in claim 5, wherein
the sharpness range comprises sharpness ranges of different color sub-images, and
the depth range comprises depth ranges of different color sub-images.

7. The gesture recognition system as claimed in claim 1, wherein the processing unit is further configured to perform a sub-sampling process before obtaining the current sharpness value, and a sub-sampled pixel area of the sub-sampling process is at least a 6×6 pixel area.

8. The gesture recognition system as claimed in claim 1, wherein the processing unit is further configured to calculate a three-dimensional coordinate of the object image according to the image frame or at least one color sub-image of the image frame.

9. The gesture recognition system as claimed in claim 8, wherein the processing unit is further configured to interact with a display device according to a coordinate variation of the three-dimensional coordinate.

10. The gesture recognition system as claimed in claim 1, wherein the different color pixels are configured to receive light through the same EDOF lens.

11. A gesture recognition method, comprising:
constructing comparison information of depths versus sharpness of an extend depth of field (EDOF) lens in association with different light colors;
capturing an image frame with an image sensor through the EDOF lens, wherein
the image frame comprises different color pixels arranged in a matrix, and
one color pixel among every two adjacent pixels in the image frame is associated with a first color and the other color pixel among the every two adjacent pixels in the image frame is associated with a second color different from the first color;
calculating a current sharpness value of at least one object image in the image frame with a processing unit, wherein the current sharpness value is obtained by calculating a highest value of modulation transfer function values of the image frame captured through the EDOF lens; and
obtaining a current depth of the object image according to the current sharpness value and the comparison information.

12. The gesture recognition method as claimed in claim 11, further comprising, after the capturing the image frame with the image sensor through the EDOF lens:
separating the image frame into a plurality of color sub-images;
calculating, using the processing unit, a current color sharpness value of the at least one object image in at least one of the color sub-images of the image frame; and
obtaining the current depth according to
the current color sharpness value in said at least one color sub-image, and
the comparison information.

13. The gesture recognition method as claimed in claim 11, further comprising:
setting an operable range.

14. The gesture recognition method as claimed in claim 13, further comprising:
removing the object image outside the operable range.

15. The gesture recognition method as claimed in claim 13, wherein the operable range is a sharpness range or a depth range.

16. The gesture recognition method as claimed in claim 15, wherein the sharpness range comprises sharpness ranges of different color sub-images, and the depth range comprises depth ranges of different color sub-images.

17. The gesture recognition method as claimed in claim 11, further comprising, before the calculating the current sharpness value:
performing, using the processing unit, a sub-sampling process on the image frame, and a sub-sampled pixel area of the sub-sampling process is at least a 6×6 pixel area.

18. The gesture recognition method as claimed in claim 11, further comprising:
calculating, using the processing unit, a three-dimensional coordinate of the object image according to the image frame or at least one color sub-image of the image frame; and
controlling, using the processing unit, a display device according to a coordinate variation of the three-dimensional coordinate.

19. A gesture recognition system, comprising:
an extend depth of field (EDOF) lens;
an image sensor configured to successively capture image frames through the EDOF lens, wherein
the image frames comprise different color pixels arranged in a matrix, and
one color pixel among every two adjacent pixels in the image frames is associated with a first color and the other color pixel among the every two adjacent pixels in the image frames is associated with a second color different from the first color;
a memory unit configured to previously store a sharpness range of the EDOF lens in association with different light colors; and
a processing unit configured to perform gesture recognition according to current sharpness values of at least one object image within the sharpness range in the image frames, wherein the current sharpness values are obtained by calculating highest values of modulation transfer function values of the image frames captured through the EDOF lens.

20. The gesture recognition system as claimed in claim 19, wherein the sharpness range comprises a red light sharpness range, a green light sharpness range and a blue light sharpness range.

21. The gesture recognition system as claimed in claim 19, wherein the processing unit is further configured to perform a sub-sampling process before performing the gesture recognition, and a sub-sampled pixel area of the sub-sampling process is at least a 6×6 pixel area.

* * * * *